(12) United States Patent
Shirane et al.

(10) Patent No.: US 7,118,800 B2
(45) Date of Patent: Oct. 10, 2006

(54) LAMINATES AND PACKAGING CONTAINERS

(75) Inventors: Takashi Shirane, Tokyo (JP); Yoichiro Inoue, Tokyo (JP); Shigeyuki Ikeharaya, Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 0 days.

(21) Appl. No.: 10/495,114

(22) PCT Filed: Nov. 21, 2002

(86) PCT No.: PCT/JP02/12156

§ 371 (c)(1),
(2), (4) Date: Nov. 23, 2004

(87) PCT Pub. No.: WO03/043819

PCT Pub. Date: May 30, 2003

(65) Prior Publication Data

US 2005/0084695 A1    Apr. 21, 2005

(30) Foreign Application Priority Data

Nov. 21, 2001  (JP)  ............................. 2001-355468
Dec. 13, 2001  (JP)  ............................. 2001-379418

(51) Int. Cl.
B32B 7/02       (2006.01)
B32B 7/12       (2006.01)
B32B 27/08      (2006.01)
B32B 27/34      (2006.01)
B32B 27/36      (2006.01)

(52) U.S. Cl. ............... 428/212; 428/474.4; 428/475.2; 428/475.5; 428/480; 525/437; 525/439

(58) Field of Classification Search .................. None
See application file for complete search history.

(56) References Cited

U.S. PATENT DOCUMENTS

| 4,259,458 | A | * | 3/1981 | Robeson ..................... 525/68 |
| 4,659,757 | A | * | 4/1987 | Okamoto et al. ............ 523/436 |
| 4,877,682 | A | * | 10/1989 | Sauers et al. ............... 428/412 |
| 5,068,136 | A | * | 11/1991 | Yoshida et al. ............. 428/35.7 |
| 5,750,219 | A | * | 5/1998 | Harada et al. .............. 428/35.7 |
| 5,955,181 | A | * | 9/1999 | Peiffer et al. ............... 428/212 |

(Continued)

FOREIGN PATENT DOCUMENTS

EP              698631 A        2/1986

(Continued)

*Primary Examiner*—Vivian Chen
(74) *Attorney, Agent, or Firm*—Armstrong, Kratz, Quintos, Hanson & Brooks, LLP

(57) ABSTRACT

A laminate has a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate. Thus, it can be used suitably as a packaging container for food and drink, such as jelly containers, which has flavor resistance and aroma retention sufficient not to be limited by types of flavor used for jelly or the like, excels in sealing properties with a lid body, can be hermetically sealed with an easy-peel transparent lid body, and is also superior in gas barrier properties, impact resistance, heat resistance, cost efficiency and transparency.

20 Claims, 2 Drawing Sheets

U.S. PATENT DOCUMENTS

| | | | |
|---|---|---|---|
| 6,149,995 A | 11/2000 | Peiffer et al. | |
| 6,703,119 B1 * | 3/2004 | Peiffer et al. | 428/332 |
| 6,787,218 B1 * | 9/2004 | Peiffer et al. | 428/212 |
| 6,787,219 B1 * | 9/2004 | Peiffer et al. | 428/212 |
| 6,866,920 B1 * | 3/2005 | Janssens et al. | 428/212 |

FOREIGN PATENT DOCUMENTS

| | | |
|---|---|---|
| EP | 785067 A | 7/1997 |
| EP | 878297 A | 11/1998 |
| EP | 878298 A | 11/1998 |
| JP | 1-200959 | 8/1989 |
| JP | 2-248249 | 10/1990 |
| JP | 2-276639 | 11/1990 |
| JP | 6-345131 | 12/1994 |
| JP | 8-217895 | 8/1996 |
| JP | 8-300584 | 11/1996 |
| JP | 9-39183 | 2/1997 |
| JP | 10-305540 | 11/1998 |
| JP | 10-315417 | 12/1998 |
| JP | 11-314330 | 11/1999 |
| JP | 11-314332 | 11/1999 |
| JP | 11-314337 | 11/1999 |
| JP | 2000-313095 | 11/2000 |
| JP | 2002-097361 * | 4/2002 |

* cited by examiner (a)

(b)

(a)

(b)

LAMINATES AND PACKAGING CONTAINERS

TECHNICAL FIELD

The present invention relates to a plastic laminate and a container which is formed of it and used for food, drink or the like.

BACKGROUND ART

As a material for food packaging, plastic having improved heat resistance and the like is now being used increasingly. And, polyethylene-2,6-naphthalate (PEN), which is one type of polyester resin, is particularly superior to polyethylene terephthalate (PET) in mechanical strength (Young's modulus, breaking strength), heat resistance (long-term heat stability, dimensional stability), ultraviolet shielding property (weather resistance), chemical properties (chemical resistance, gas barrier properties) and the like because of inflexibility and planarity of its molecular chain, and has come into the limelight in recent years. But, it has inferior heat-sealing properties with a lid material. Specifically, it has poor heat-sealing properties with an aluminum closure (aluminum foil lid material) which has a polyester based adhesive layer as the innermost layer and also inferior adhesive force depending on use conditions. And, because the forming conditions are different when the PEN resin is contained, it cannot be included in a recycling system of the PET resin and also has the same drawback as the multi-layered film in view of recycling efficiency. Besides, there were also problems of impact resistance and high cost.

The present inventors have proposed, as packing materials for food which are free from the drawbacks of polyethylene-2,6-naphthalate (PEN), a polyester copolymer indicated by a general formula, HO—(COArCOORO)$_n$—H (n is 100 to 1000. But, Ar is 2,6-naphthalene group and phenylene group, and R is ethylene group and 1,4-cyclohexylene group.) (Japanese Patent Application Laid-Open Publication No. Hei 8-113631) and a laminated sheet made of a polymer alloy formed of a polyarylate resin and a thermoplastic polyester resin (Japanese Patent Application Laid-Open Publication No. Hei 11-34271).

The former copolymer excels in heat resistance, impact resistance, heat-sealing properties with a lid material, gas barrier properties and recycling efficiency, but the copolymer has a problem of high cost when it is used as a single-layer film for a food packaging container. And, the latter laminated sheet is superior in heat resistance, impact resistance and heat-sealing properties with a lid material but insufficient in gas barrier properties, flavor resistance (flavor attack resistance) and aroma retention. For example, when it is used as a jelly container, it has a problem of being limited by used flavor.

It is an object of the present invention to remedy the problems of the prior art and to provide a transparent plastic laminated sheet which has sufficient flavor resistance and aroma retention and also excels in gas barrier properties (oxygen barrier properties), impact resistance, heat resistance, sealing properties and cost efficiency.

And, its object is to provide a transparent plastic laminated sheet which excels in heat-sealing properties with a lid material and recycling efficiency, has sufficient flavor resistance and aroma retention, and also excels in gas barrier properties (oxygen barrier properties), impact resistance, heat resistance, cold-impact resistance and cost efficiency.

Besides, its object is to provide a packaging container for food, drink and the like, which is formed of the above-described plastic laminated sheet.

DISCLOSURE OF THE INVENTION

A first laminate of the present invention is a laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate.

A second laminate of the present invention is a laminate having a core layer and a skin layer on either side of the core layer, wherein the skin layer is formed of a polyester copolymer which consists of 2,6-naphthalene dicarboxylic acid or its lower alkyl ester, terephthalic acid or its lower alkyl ester, 1,4-cyclohexane dimethanol and ethylene glycol.

Besides, a packaging container of the present invention is a packaging container having a container body with an opening at the upper part, wherein the container body is formed of the above-described laminate.

BEST MODE FOR CARRYING OUT THE INVENTION

Figure 1:
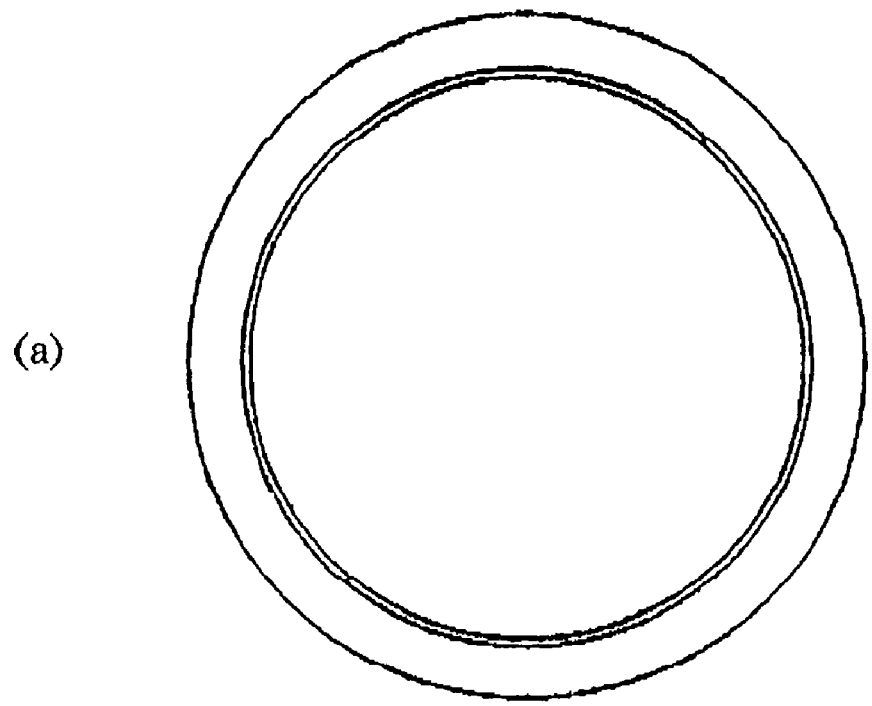
FIG. 1 is a diagram showing one example of the shape of a container body of the present invention, (a) is a top view and (b) is a cross-sectional view.
Figure 1:
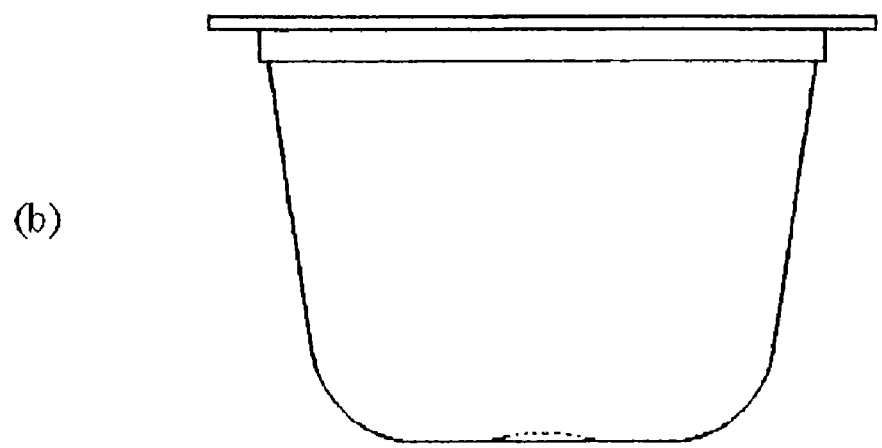

The present invention will be described in detail.

The glass transition point in the present invention indicates a value determined from a transition point by raising a temperature (10° C./min) by a differential scanning calorimetric analyzer (DSC).

[First Laminate]

A first laminate is a laminate having a core layer and a skin layer on either side of the core layer.

The skin layer is made of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate.

Here, the lower alkyl ester of 2,6-naphthalene dicarboxylic acid and the lower alkyl ester of terephthalic acid are desired to have the number of carbon atoms of 1 to 8, preferably 1 to 5, and may also be monoester in addition to diester.

Examples of the lower alkyl ester of 2,6-naphthalene dicarboxylic acid are 2,6-dimethyl naphthalate, 2,6-diethyl naphthalate, 2,6-dipropyl naphthalate, 2,6-dibutyl naphthalate, 2,6-dipentyl naphthalate, 2,6-dihexyl naphthalate, 2,6-diheptyl naphthalate, 2,6-dioctyl naphthalate, and the like. Among them, 2,6-dimethyl naphthalate, 2,6-diethyl naphthalate, 2,6-dipropyl naphthalate, 2,6-dibutyl naphthalate and 2,6-dipentyl naphthalate are particularly preferable.

Examples of the lower alkyl ester of terephthalic acid are dimethyl terephthalate, diethyl terephthalate, dipropyl terephthalate, dibutyl terephthalate, dipentyl terephthalate, dihexyl terephthalate, diheptyl terephthalate, dioctyl terephthalate, and the like. And, dimethyl terephthalate, diethyl terephthalate, dipropyl terephthalate, dibutyl terephthalate, dipentyl terephthalate are particularly desirable.

All the above-described copolymers and polymer alloys have a glass transition point of 85° C. or more and 115° C. or below, and preferably 90° C. or more and 110° C. or below. For that, it is preferable that 2,6-naphthalene group and phenylene group are in a molar ratio (2,6-naphthalene group/phenylene group) of 30/70 to 92/8, and desirably 40/60 to 80/20, and more desirably 50/50 to 80/20. When the molar ratio of 2,6-naphthalene group is higher than the above range, it is not desirable in view of impact resistance and cost efficiency, and when it is lower than the above range, it is not desirable in view of heat resistance and gas barrier properties.

Specific examples of the first laminate will be described below, but it is to be noted that the first laminate is not limited to them.

<Embodiment 1-1>

Embodiment 1-1 is a laminate having a three-layered structure formed of a core layer and a skin layer which is laminated on either side of the core layer.

The core layer is formed of a polymer alloy which consists of a heat-resistant resin and a thermoplastic polyester resin and contains 50 to 65 wt % of the heat-resistant resin (hereinafter simply referred to as the "heat-resistant resin") having a glass transition point of 140° C. to 250° C. and an Izod impact test value of 80 J/m to 850 J/m when tested with a ⅛" notch under conditions of 23° C. and a relative humidity of 50%. It is not desirable if the heat-resistant resin content is less than 50 wt % in view of heat resistance and, if it exceeds 65 wt %, it is not desirable in view of extrudability, moldability and cost efficiency.

Here, the thermoplastic polyester resin is a resin other than the heat-resistant resins and preferably a linear polyethylene terephthalate homopolymer which has an ethylene terephthalate unit or a butylene terephthalate unit as a repeating unit respectively, but terephthalic acid may be partly replaced with phthalic acid, isophthalic acid, succinic acid, adipic acid, sebacic acid, docecane dicarboxylic acid, hexahydroterephthalic acid, 2,6-naphthalene dicarboxylic acid, 2,5-dibromterephthalic acid, diphenyl dicarboxylic acid, trimellitic acid, pyromellitic acid, or the like. And, ethylene glycol may be partly replaced with propylene glycol, diethylene glycol, tetraethylene glycol, polyethylene glycol, polytetramethylene glycol, 1,6-hexanediol, trimethylene glycol, neopentyl glycol, p-xylene glycol, 1,6-cyclohexane dimethanol, bisphenol A, glycerin, pentaerythritol, trimethanol propane, trimethanol benzene, triethanol benzene, or the like. Among them, a polyethylene terephthalate resin (PET) is particularly desirable.

And, one having an intrinsic viscosity (determined from a viscosity of the solution measured at 25° C. in a mixture solution of 50 wt % of phenol and 50 wt % of tetrachloroethane,) in a range of from 0.5 to 1.4 is desirable, and it is more desirable in a range of 0.6 to 1.2. When the intrinsic viscosity is less than 0.5, extrusion processability and container moldability become poor, and the molded container tends to have a degraded strength against drop and to become fragile. And, when the intrinsic viscosity exceeds 1.4, there are tendencies that the cost becomes high and, productivity of sheets become worse.

Then, the heat-resistant resin includes, for example, polyarylate resin (PAR), polycarbonate resin (PC), polysulfone, polyether ketone, and the like, and the polyarylate resin (PAR) is particularly desirable. The polyarylate resin (PAR) is obtained from aromatic dicarboxylic acid or its functional derivative and dihydric phenol or its functional derivative.

As the aromatic dicarboxylic acid, any type may be acceptable as long as it reacts with dihydric phenol to provide a satisfactory polymer and may be used alone or as a mixture of two or more. Preferable aromatic dicarboxylic acid includes terephthalic acid and isophthalic acid, and a mixture of them is particularly desirable in view of melt processability and overall performance. Such a mixture is desired to be terephthalic acid/isophthalic acid=9/1 to 1/9 (molar ratio), and more desirably 7/3 to 3/7 (molar ratio) in view of a balance of melt processability and performance.

And, specific examples of the dihydric phenol are 2,2-bis(4-hydroxyphenyl)propane, 2,2-bis(4-hydroxy-3,5-dibromophenyl)propane, 2,2-bis(4-hydroxy-3,5-dichlorophenyl)propane, 4,4-dihydroxy diphenyl sulfone, 4,4-dihydroxy diphenyl ether, 4,4-dihydroxy diphenyl sulfide, 4,4-dihydroxydiphenyl ketone, 4,4-dihydroxy phenylmethane, 2,2-bis(4-hydroxy-3,5-dimethylphenyl)propane, 1,1-bis(4-hydroxyphenyl)ethane, 1,1-bis(4-hydroxyphenyl)cyclohexane, 4,4-dihydroxydiphenyl, benzoquinone, and the like. They may be used alone or as a mixture of two or more. The above dihydric phenol is para substituted, but another isomer may be used. As the dihydric phenol, ethylene glycol, propylene glycol or the like can be used. Among the dihydric phenols, the most typical one is 2,2-bis(4-hydroxyphenyl)propane, which is generally called bisphenol A and most desirable in view of total physical properties.

Therefore, the most desirable polyarylate resin (PAR) of the present invention is obtained from a mixture of terephthalic acid and isophthalic acid, or a mixture of their functional derivatives (but, a molar ratio of a terephthalic acid residue and an isophthalic acid residue is 9/1 to 1/9, and particularly 7/3 to 3/7) and dihydric phenol, particularly bisphenol A or its functional derivative. Specific examples include a resin obtained from bisphenol A, terephthalic dichloride and isophthalic dichloride, and its structural formula is expressed by the following general formula (1).

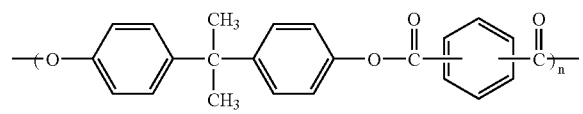

And, it is preferable that the polyarylate resin (PAR) according to the present invention has the intrinsic viscosity in a range of 0.5 to 0.8, which is determined from a solution viscosity measured in a mixture solution of 50 wt % of phenol and 50 wt % of tetrachloroethane at 25° C., namely a weight-average molecular weight in a range of approximately 7,000 to 100,000, in view of the physical properties of the laminate, the extrusion processing characteristics when the laminate is co-extrusion molded, container moldability, and the like.

Thickness is not particularly limited but preferably 200 µm to 3000 µm. The ratio of respective layers in thickness is not particularly limited, but it is preferable that the skin layer is 10 to 40% of the whole, and the core layer is 90 to 60% of the whole.

Embodiment 1-1 has flavor resistance and aroma retention sufficient not to be limited by types of flavor used for jelly or the like, excels in sealing properties with a lid body and can be hermetically sealed with an easy-peel transparent lid body. It is also superior in gas barrier properties (oxygen barrier properties), impact resistance, heat resistance, cost efficiency and transparency and can be used suitably as a packaging container for food and drink, such as jelly containers.

<Embodiment 1-2>

Embodiment 1-2 is a laminate having a five-layered structure consisting of a core layer, an intermediate layer laminated on either side of the core layer and a skin layer laminated on the intermediate layer.

The core layer is formed of a amorphous resin which includes a thermoplastic polyester resin as the main constituent. A crystalline resin is not desirable because whitening may occur when forming.

Here, the same thermoplastic polyester resin as described in connection with the core layer of Embodiment 1-1 is used. The above-described main constituent means 50 wt % or more, preferably 93 wt % or more, of the thermoplastic polyester resin.

Specifically, a polymer alloy consisting of 90 wt % to 40 wt % of polyethylene terephthalate (PET), 5 wt % to 30 wt % of polyethylene-2,6-naphthalate (PEN) and 5 wt % to 30 wt % of a heat-resistant resin can be used suitably. And, in a range not changing the molar ratio of 2,6-naphthalene group and phenylene group (2,6-naphthalene group/phenylene group), polyethylene terephthalate (PET) and polyethylene-2,6-naphthalate (PEN) may be replaced partly or wholly with a copolymer consisting of 2,6-naphthalene dicarboxylic acid or its lower alkyl ester, terephthalic acid or its lower alkyl ester and ethylene glycol, or a returned item (skeleton: a residue remained by punching a sheet to form a product such as a cup-shaped container or the like) may be used.

The intermediate layer is formed of a polymer alloy consisting of a heat-resistant resin and a thermoplastic polyester resin, which contains 50 to 65 wt % of the heat-resistant resin, and the same polymer alloy as that forming the core layer of Embodiment 1-1 can be used.

Thickness is not particularly limited but desirably 200 μm to 3000 μm. And, the ratio of respective layers in thickness is not particularly limited, but it is preferable that the skin layer is 10 to 45% of the whole, the intermediate layer is 10 to 45% of the whole, and the core layer is 80 to 10% of the whole, and it is more preferable that the skin layer is 10 to 30% of the whole, the intermediate layer is 20 to 40% of the whole, and the core layer is 70 to 30% of the whole.

Embodiment 1-2 maintains the same effect as Embodiment 1-1 and can also use as a resin for the core layer a returned item, which is produced at the time of sheet forming and container forming and superior in the cost performance.

<Embodiment 1-3>

Embodiment 1-3 is a laminate having a three-layered structure consisting of a core layer and a skin layer laminated on either side of the core layer.

The core layer is formed of a copolymer having a glass transition point of 110° C. or more and consisting of 2,6-naphthalene dicarboxylic acid or its lower alkyl ester, terephthalic acid or its lower alkyl ester and ethylene glycol or a polymer alloy having a glass transition point of 110° C. or more and consisting of polyethylene terephthalate and polyethylene-2,6-naphthalate, and preferably having a different glass transition point from the copolymer or the polymer alloy forming the skin layer.

Here, the lower alkyl ester of 2,6-naphthalene dicarboxylic acid and the lower alkyl ester of terephthalic acid can be the same as those described in connection with the skin layer.

The above copolymer and polymer alloy each have a glass transition point of 110° C. or more, and preferably 115% or more. For that, a molar ratio of 2,6-naphthalene group and phenylene group (2,6-naphthalene group/phenylene group) is preferably 80/20 to 100/0, and more preferably 92/8 to 100/0. When the molar ratio of the 2,6-naphthalene group is lower than the above range, it is not desirable in view of oxygen barrier properties and heat resistance.

Thickness is not particularly limited but desirably 200 μm to 3000 μm. And, the ratio of respective layers in thickness is not particularly limited, but it is preferable that the skin layer is 10 to 40% of the whole, and the core layer is 90 to 60% of the whole.

Embodiment 1-3 maintains the same effect as Embodiment 1-1, and its oxygen barrier properties are better than Embodiment 1-1.

<Embodiment 1-4>

Embodiment 1-4 is a laminate having a five-layered structure consisting of a core layer, an intermediate layer laminated on either side of the core layer and a skin layer laminated on the intermediate layer.

The core layer is formed of a amorphous resin including a thermoplastic polyester resin as the main constituent. A crystalline resin is not desirable because whitening may occur when forming.

Here, as the thermoplastic polyester resin, the same one as described in connection with the core layer of Embodiment 1-1 is used. The above-described main constituent means 50 wt % or more, and desirably 93 wt % or more, of the thermoplastic polyester resin.

Specifically, a polymer alloy consisting of 95 wt % to 60 wt % of polyethylene terephthalate (PET) and 5 wt % to 40 wt % of polyethylene-2,6-naphthalate (PEN) can be used suitably, and in a range not changing a molar ratio of 2,6-naphthalene group and phenylene group (2,6-naphthalene group/phenylene group), polyethylene terephthalate (PET) and polyethylene-2,6-naphthalate (PEN) may be partly or wholly replaced with a copolymer consisting of 2,6-naphthalene dicarboxylic acid or its lower alkyl ester, terephthalic acid or its lower alkyl ester and ethylene glycol, or a returned item may be used.

The intermediate layer is formed of a copolymer having a glass transition point of 110° C. or more and consisting of 2,6-naphthalene dicarboxylic acid or its lower alkyl ester, terephthalic acid or its lower alkyl ester and ethylene glycol or a polymer alloy having a glass transition point of 110° C. or more and consisting of polyethylene terephthalate and polyethylene-2,6-naphthalate, and the same copolymer or polymer alloy as that forming the core layer of Embodiment 1-3 can be used.

Thickness is not particularly limited but desirably 200 μm to 3000 μm. And, the ratio of respective layers in thickness is not particularly limited, but it is preferable that the skin layer is 10 to 45% of the whole, the intermediate layer is 10 to 45% of the whole, and the core layer is 80 to 10% of the whole. And, it is more desirable that the skin layer is 10 to 30% of the whole, the intermediate layer is 20 to 40% of the whole, and the core layer is 70 to 30% of the whole.

Embodiment 1-4 maintains the same effect as Embodiment 1-3, and a returned item can also be used as a resin for the core layer and is superior in the cost performance.

<Embodiment 1-5>

Embodiment 1-5 is a laminate having a seven-layered structure consisting of a core layer, an intermediate layer laminated on either side of the core layer and a skin layer laminated on the intermediate layer, wherein the core layer consists of an innermost layer and an adhesive layer laminated on either side of the innermost layer.

The innermost layer is formed of polyamide (MXD6) which is formed by melt polymerization of a diamine component containing 70 mol % or more of metaxylylene diamine and a dicarboxylic acid component containing 70 mol % or more of adipic acid.

The diamine component is required to contain 70 mol % or more of metaxylylene diamine. When the diamine component contains 70% or more of metaxylylene diamine, remarkable gas barrier properties can be maintained. The diamines usable other than metaxylylene diamine are, for example, paraxylylene diamine, 1,3-bis(aminomethyl)cyclohexane, 1,4-bis(aminomethyl)cyclohexane, tetramethylene diamine, hexamethylene diamine, nonamethylene diamine, 2-methyl-1,5-pentane diamine, and the like.

And, the dicarboxylic acid component is required to contain 70 mol % or more of adipic acid. When the dicarboxylic acid component contains 70 mol % or more of adipic acid, it is possible to avoid degrading the gas barrier properties and crystallizability. The dicarboxylic acid components usable other than the adipic acid are, for example, suberic acid, azelaic acid, sebacic acid, 1,10-decandicarboxylic acid, terephthalic acid, isophthalic acid, 2,6-naphthalene dicarboxylic acid, and the like.

As a molecular weight modifier, a small amount of monoamine or monocarboxylic acid may be added at the time of polycondensation of the polyamide.

The above polyamide is produced by a melt polycondensation process. For example, it is produced by a method which raises a temperature of nylon salt consisting of adipic acid and metaxylylene diamine in the presence of water under pressure and polymerizes in a molten state while removing the added water and condensation water. It is also produced by directly adding metaxylylene diamine to the adipic acid in a molten state and polycondensing under ordinary pressure. In such a case, in order to keep the reaction system in a uniform liquid state, metaxylylene diamine is continuously added to the adipic acid, during which the reaction system is kept raised its temperature to prevent the reaction temperature from lowering to a level lower than the melting points of oligoamide and polyamide being produced so to proceed the polycondensation.

A relatively low-molecular-weight polyamide obtained by the melt polymerization generally has relative viscosity of approximately 2.28 (a value determined at 25° C. after dissolving 1 g of a polyamide resin in 100 ml of a 96% aqueous sulfuric acid solution, and the same is also applied below). When relative viscosity after the melt polymerization is 2.28 or below, a gel-state substance is produced in a small amount, and polyamide having high quality with good color tone can be obtained. It is desirable that the relatively low-molecular-weight polyamide obtained by the melt polymerization is further subjected to solid-state polymerization. The solid-state polymerization is performed by pelletizing or powdering the relatively low-molecular-weight polyamide obtained by the melt polymerization and heating it to a temperature in a range of 150° C. to a melting point of the polyamide under reduced pressure or in an atmosphere of inert gas. The solid-state polymerized polyamide desirably has a relative viscosity of 2.3 to 4.2. In this range, the laminate or container can be formed favorably, and the obtained laminate or container has good performance, and particularly good mechanical performance.

The adhesive layer is preferably an acid-modified polyolefin resin and, specifically, an "ADMER" produced by Mitsui Chemicals, "MODIC" produced by Mitsubishi Chemical Corporation, or the like can be used suitably.

The intermediate layer is formed of a polymer alloy consisting of a heat-resistant resin and a thermoplastic polyester resin, which contains 50 to 65 wt % of the heat-resistant resin. And, the same polymer alloy as that forming the core layer of Embodiment 1-1 can be used.

Thickness is not particularly limited but desirably 200 μm to 3000 μm. And, the ratio of respective layers in thickness is not particularly limited, but it is preferable that the skin layer is 10 to 82% of the whole, the intermediate layer is 10 to 45% of the whole, the adhesive layer is 3 to 20% of the whole, and the innermost layer is 5 to 25% of the whole.

Embodiment 1-5 maintains the same effect as Embodiment 1-1 and excels Embodiments 1-1 and 1-3 in oxygen barrier properties.

<Embodiment 1-6>

Embodiment 1-6 is a laminate having an eight-layered structure which has an intermediate core layer formed between the intermediate layer and the adhesive layer on one side of the core layer in the laminated structure of Embodiment 1-5.

The intermediate core layer is formed of a amorphous resin which includes a thermoplastic polyester resin as the main constituent. A crystalline resin is not desirable because whitening may occur at the time of forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy consisting of 20 wt % to 85 wt % of polyethylene terephthalate (PET), 2 wt % to 20 wt % of polyethylene-2,6-naphthalate (PEN), 5 wt % to 20 wt % of a heat-resistant resin, 4 wt % to 25 wt % of polyamide (MXD6) and 4 wt % to 15 wt % of an acid-modified polyolefin resin can be used suitably. And, in a range not changing the molar ratio of 2,6-naphthalene group and phenylene group (2,6-naphthalene group/phenylene group), polyethylene terephthalate (PET) and polyethylene-2,6-naphthalate (PEN) may be partly or wholly replaced with a copolymer consisting of 2,6-naphthalene dicarboxylic acid or its lower alkyl ester, terephthalic acid or its lower alkyl ester and ethylene glycol, or a returned item may be used.

Thickness is not particularly limited but desirably 200 μm to 3000 μm. And, the ratio of respective layers in thickness is not particularly limited, but it is preferable that the skin layer is 10 to 25% of the whole, the intermediate layer is 10 to 30% of the whole, the adhesive layer is 3 to 15% of the whole, the innermost layer is 5 to 20% of the whole, and the intermediate core layer is 10 to 72% of the whole.

Embodiment 1-6 maintains the same effect as Embodiment 1-5 excepting transparency, and a returned item can be used as the resin for the intermediate core layer. Thus, it is superior in the cost performance and can be applied suitably to usage not requiring transparency.

<Embodiment 1-7>

Embodiment 1-7 is a laminate having a five-layered structure formed of a core layer and a skin layer which is laminated on either side of the core layer, wherein the core layer is formed of an innermost layer and an adhesive layer which is laminated on either side of the innermost layer.

The innermost layer is formed of polyamide (MXD6) which is obtained by melt polymerization of a diamine component containing 70 mol % or more of metaxylylene diamine and a dicarboxylic acid component containing 70 mol % or more of adipic acid, and the same polyamide (MXD6) as that forming the core layer of Embodiment 1-5 can be used.

The adhesive layer can be the same adhesive layer as that of Embodiment 1-5.

Thickness is not particularly limited but desirably 200 µm to 3000 µm. And, the ratio of respective layers in thickness is not particularly limited, but it is preferable that the skin layer is 50 to 92% of the whole, the adhesive layer is 3 to 25% of the whole, and the innermost layer is 5 to 25% of the whole.

Embodiment 1-7 maintains the same effect as Embodiment 1-1 excepting heat resistance and excels Embodiments 1-1 and 1-3 in oxygen barrier properties. Its heat resistance is sufficient to withstand sterilization conditions of aseptic filling food and, therefore, it can be used suitably as a packaging container for aseptic filling food and drink.

<Embodiment 1-8>

Embodiment 1-8 is a laminate having a six-layered structure which has an intermediate core layer formed between the skin layer and the adhesive layer on one side of the core layer in the laminated structure of Embodiment 1-7.

The intermediate core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy consisting of 13 wt % to 90 wt % of polyethylene terephthalate (PET), 2 wt % to 42 wt % of polyethylene-2,6-naphthalate (PEN), 4 wt % to 25 wt % of polyamide (MXD6) and 4 wt % to 20 wt % of an acid-modified polyolefin resin can be used suitably. And, in a range not changing the molar ratio of 2,6-naphthalene group and phenylene group (2,6-naphthalene group/phenylene group), polyethylene terephthalate (PET) and polyethylene-2,6-naphthalate (PEN) may be partly or wholly replaced with a copolymer consisting of 2,6-naphthalene dicarboxylic acid or its lower alkyl ester, terephthalic acid or its lower alkyl ester and ethylene glycol, or a returned item may be used.

Thickness is not particularly limited but desirably 200 µm to 3000 µm. And, the ratio of respective layers in thickness is not particularly limited, but it is preferable that the skin layer is 10 to 45% of the whole, the adhesive layer is 3 to 20% of the whole, the innermost layer is 5 to 25% of the whole, and the intermediate core layer is 10 to 82% of the whole.

Embodiment 1-8 maintains the same effect as Embodiment 1-7 excepting transparency, can use a returned item as the resin for the intermediate core layer and excels in the cost performance. And, it can be used suitably as a packaging container for aseptic filling food and drink, which is not required to have transparency.

[Second Laminate]

The second laminate is a laminate which has a core layer and a skin layer on either side of the core layer.

The skin layer is formed of a polyester copolymer which consists of 2,6-naphthalene dicarboxylic acid or its lower alkyl ester, terephthalic acid or its lower alkyl ester, 1,4-cyclohexane dimethanol and ethylene glycol. Specifically, the polyester copolymer is indicated by a general formula, HO—(COArCOORO)$_n$—H (n is 100 to 1000, preferably 100 to 400. But, Ar indicates 2,6-naphthalene group and phenylene group, and R indicates ethylene group and 1,4-cyclohexylene group).

Here, as the lower alkyl ester of 2,6-naphthalene dicarboxylic acid and the lower alkyl ester of terephthalic acid, the same ones as described in connection with the skin layer of the first laminate can be used.

The above polyester copolymer is desired that a molar ratio of 2,6-naphthalene group and phenylene group (2,6-naphthalene group/phenylene group) is 50/50 to 98/2, and preferably 60/40 to 95/5, a molar ratio of 1,4-cyclohexylene group and ethylene group (1,4-cyclohexylene group/ethylene group) is 95/5 to 10/90, preferably 60/40 to 10/80, and a molar ratio of a cis form and a trans form (cis/trans) of the 1,4-cyclohexylene group is in a range of 0/100 to 40/60.

It has a tendency that, when a ratio of 2,6-naphthalene group exceeds 98 mol % and a ratio of phenyl group is less than 2 mol %, recycling efficiency and heat-sealing properties are degraded, and when the ratio of 2,6-naphthalene group is less than 50 mol % and the ratio of phenyl group exceeds 50 mol %, the heat resistance, resistance to hot water and resistance to whitening are degraded.

And, when the ratio of 1,4-cyclohexylene group exceeds 95 mol % and the ethylene group is less than 5 mol %, crystallizability proceeds, and resistance to whitening in hot water tends to become inferior. When the ratio of 1,4-cyclohexylene group is less than 10 mol % and the ethylene group exceeds 90 mol %, recycling efficiency and heat-sealing properties are degraded, and it has a tendency to become not suitable as a packaging container. Similarly, in the 1,4-cyclohexylene group, when the ratio of cis form exceeds 40 mol % in the ratio of cis/trans forms, namely when the ratio of trans form is less than 60 mol %, there is a tendency that the heat resistance lowers, and it becomes unsuitable as a packaging container.

Specific examples of the second laminate will be described below, but it is to be noted that the second laminate is not limited to them.

<Embodiment 2-1>

Embodiment 2-1 is a laminate having a three-layered structure consisting of a core layer and a skin layer laminated on either side of the core layer.

The core layer is formed of a polymer alloy consisting of a heat-resistant resin and a thermoplastic polyester resin, which contains 50 to 65 wt % of the heat-resistant resin, and the same polymer alloy as that forming the core layer of Embodiment 1-1 can be used.

The core layer has an effect of giving impact resistance to the laminate when 2,6-naphthalene group of the polyester copolymer used for the skin layer is 85 mol % or more (phenylene group is 15 mol % or below) and an effect of giving impact resistance and heat resistance to the laminate when 2,6-naphthalene group is less than 85 mol % (phenylene group exceeds 15 mol %). When the 2,6-naphthalene group of the polyester copolymer used for the skin layer is 85 mol % or more and high impact resistance is not required, the core layer may be thermoplastic polyester not containing a heat-resistant resin. This will be described later as Embodiment 2-9.

Thickness is not particularly limited but desirably 200 μm to 3000 μm. And, the ratio of respective layers in thickness is not particularly limited, but it is preferable that the skin layer is 10 to 40% of the whole, and the core layer is 90 to 60% of the whole.

Embodiment 2-1 is superior in sealing properties with a lid body, can be closed tightly by an aluminum closure, excels in recycling efficiency with the PET resin, and has flavor resistance and aroma retention sufficient not being limited by types of flavors used for jelly, water ice or the like. It is also superior in gas barrier properties (oxygen barrier properties), impact resistance, cold-impact resistance, heat resistance and transparency and can be used suitably as a packaging container for food and drink, such as jelly containers, water ice containers and the like.

<Embodiment 2-2>

Embodiment 2-2 is a laminate having a five-layered structure formed of a core layer, an intermediate layer laminated on either side of the core layer and a skin layer laminated on the intermediate layer.

The core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy of 90 wt % to 45 wt % of polyethylene terephthalate (PET), 15 wt % to 30 wt % of the polyester copolymer used for the skin layer and 15 wt % to 25 wt % of a heat-resistant resin can be used suitably, and a returned item may be used.

The intermediate layer is formed of a polymer alloy consisting of a heat-resistant resin and a thermoplastic polyester resin, which contains 50 to 65 wt % of the heat-resistant resin. The same polymer alloy as that forming the core layer of Embodiment 1-1 can be used.

The intermediate layer has an effect of giving impact resistance to the laminate when 2,6-naphthalene group of the polyester copolymer used for the skin layer is 85 mol % or more (phenylene group is 15 mol % or below) and an effect of giving impact resistance and heat resistance to the laminate when the 2,6-naphthalene group is less than 85 mol % (phenylene group exceeds 15 mol %).

Thickness is not particularly limited but desirably 200 μm to 3000 μm. And, the ratio of respective layers in thickness is not particularly limited, but it is preferable that the skin layer is 10 to 45% of the whole, the intermediate layer is 10 to 45% of the whole, the core layer is 80 to 10% of the whole, and it is more desirable that the skin layer is 10 to 30% of the whole, the intermediate layer is 20 to 40% of the whole, and the core layer is 70 to 30% of the whole.

Embodiment 2-2 maintains the same effect as Embodiment 2-1 and can also use as a resin for the core layer a returned item, which is produced at the time of sheet forming and container forming, and it is superior in the cost performance.

<Embodiment 2-3>

Embodiment 2-3 is a laminate having a three-layered structure consisting of a core layer and a skin layer laminated on either side of the core layer.

The core layer is formed of a copolymer having a glass transition point of 110° C. or more and consisting of 2,6-naphthalene dicarboxylic acid or its lower alkyl ester, terephthalic acid or its lower alkyl ester and ethylene glycol or a polymer alloy having a glass transition point of 110° C. or more and consisting of polyethylene terephthalate and polyethylene-2,6-naphthalate. And, the same copolymer or polymer alloy as that forming the core layer of Embodiment 1-3 can be used.

Thickness is not particularly limited but desirably 200 μm to 3000 μm. And, the ratio of respective layers in thickness is not particularly limited, but it is preferable that the skin layer is 10 to 40% of the whole, and the core layer is 90 to 60% of the whole.

Embodiment 2-3 maintains the same effect as Embodiment 2-1 and excels Embodiment 2-1 in oxygen barrier properties.

<Embodiment 2-4>

Embodiment 2-4 is a laminate having a five-layered structure consisting of a core layer, an intermediate layer laminated on either side of the core layer and a skin layer laminated on the intermediate layer.

The core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy consisting of 13 wt % to 90 wt % of polyethylene terephthalate (PET), 8 wt % to 42 wt % of polyethylene-2,6-naphthalate (PEN) and 2 wt % to 45 wt % of the polyester copolymer used for the skin layer can be used suitably. And, in a range without changing a molar ratio of 2,6-naphthalene group and phenylene group (2,6-naphthalene group/phenylene group), polyethylene terephthalate (PET) and polyethylene-2,6-naphthalate (PEN) may be partly or wholly replaced with a copolymer consisting of 2,6-naphthalene dicarboxylic acid or its lower alkyl ester, terephthalic acid or its lower alkyl ester and ethylene glycol, and a returned item may be used.

The intermediate layer is formed of a copolymer having a glass transition point of 110 or more and consisting of 2,6-naphthalene dicarboxylic acid or its lower alkyl ester, terephthalic acid or its lower alkyl ester and ethylene glycol or a polymer alloy having a glass transition point of 110° C. or more and consisting of polyethylene terephthalate and polyethylene-2,6-naphthalate. And, the same copolymer or polymer alloy as that forming the core layer of Embodiment 1-3 can be used.

Thickness is not particularly limited but desirably 200 μm to 3000 μm. And, the ratio of respective layers in thickness is not particularly limited, but it is preferable that the skin layer is 10 to 45% of the whole, the intermediate layer is 10 to 45% of the whole, and the core layer is 80 to 10% of the whole. And, it is more desirable that the skin layer is 10 to 30% of the whole, the intermediate layer is 20 to 40% of the whole, and the core layer is 70 to 30% of the whole.

Embodiment 2-4 maintains the same effect as Embodiment 2-3 and can also use a returned item as a resin for the core layer, and it is superior in the cost performance.

<Embodiment 2-5>

Embodiment 2-5 is a laminate having a seven-layered structure consisting of a core layer, an intermediate layer laminated on either side of the core layer and a skin layer laminated on the intermediate layer, in which the core layer consists of an innermost layer and an adhesive layer laminated on either side of the innermost layer.

The innermost layer is formed of polyamide (MXD6) which is obtained by melt polymerization of a diamine component containing 70 mol % or more of metaxylylene diamine and a dicarboxylic acid component of 70 mol % or more of adipic acid, and the same polyamide (MXD6) as that forming the core layer of Embodiment 1-5 can be used.

The adhesive layer can be the same adhesive layer as that of Embodiment 1-5.

The intermediate layer is formed of a polymer alloy consisting of a heat-resistant resin and a thermoplastic polyester resin, which contains 50 to 65 wt % of the heat-resistant resin, and the same polymer alloy as that forming the core layer of Embodiment 1-1 can be used.

Thickness is not particularly limited but desirably 200 μm to 3000 μm. And, the ratio of respective layers in thickness is not particularly limited, but it is preferable that the skin layer is 10 to 82% of the whole, the intermediate layer is 10 to 45% of the whole, the adhesive layer is 3 to 20% of the whole, and the innermost layer is 5 to 25% of the whole.

Embodiment 2-5 maintains the same effect as Embodiment 2-1 and excels Embodiments 2-1 and 2-3 in oxygen barrier properties.

<Embodiment 2-6>

Embodiment 2-6 is a laminate having an eight-layered structure which has an intermediate core layer formed between the intermediate layer and the adhesive layer on one side of the core layer in the laminated structure of Embodiment 2-5.

The intermediate core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy consisting of 10 wt % to 82 wt % of polyethylene terephthalate (PET), 5 wt % to 30 wt % of a polyester copolymer used for the skin layer, 5 wt % to 20 wt % of a heat-resistant resin, 4 wt % to 25 wt % of polyamide (MXD6) and 4 wt % to 15 wt % of an acid-modified polyolefin resin can be used suitably, and a returned item may be used.

Thickness is not particularly limited but desirably 200 μm to 3000 μm. And, the ratio of respective layers in thickness is not particularly limited, but it is preferable that the skin layer is 10 to 25% of the whole, the intermediate layer is 10 to 30% of the whole, the adhesive layer is 3 to 20% of the whole, the innermost layer is 5 to 20% of the whole, and the intermediate core layer is 10 to 72% of the whole.

Embodiment 2-6 maintains the same effect as Embodiment 2-5 excepting transparency, and a returned item can be used as a resin for the intermediate core layer, excelling in the cost performance. And, it can be applied suitably to usage not requiring transparency.

<Embodiment 2-7>

Embodiment 2-7 is a laminate having a five-layered structure consisting of a core layer and a skin layer laminated on either side of the core layer, in which the core layer consists of an innermost layer and an adhesive layer laminated on either side of the innermost layer.

The innermost layer is formed of polyamide (MXD6) which is obtained by melt polymerization of a diamine component containing 70 mol % or more of metaxylylene diamine and a dicarboxylic acid component containing 70 mol % or more of adipic acid, and the same polyamide (MXD6) as that forming the core layer of Embodiment 1-5 can be used.

The adhesive layer can be the same adhesive layer as that of Embodiment 1-5.

Thickness is not particularly limited but desirably 200 μm to 3000 μm. And, the ratio of respective layers in thickness is not particularly limited, but it is preferable that the skin layer is 50 to 92% of the whole, the adhesive layer is 3 to 25% of the whole, and the innermost layer is 5 to 25% of the whole.

Embodiment 2-7 maintains the same effect as Embodiment 2-1 excepting heat resistance and excels Embodiments 2-1 and 2-3 in the oxygen barrier properties. Its heat resistance is sufficient to withstand sterilization conditions for aseptic filling food and, therefore, it can be used suitably as a packaging container for aseptic filling food and drink.

<Embodiment 2-8>

Embodiment 2-8 is a laminate having a six-layered structure which has an intermediate core layer formed between the skin layer and adhesive layer on one side of the core layer in the laminated structure of Embodiment 2-7.

The intermediate core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, a polymer alloy consisting of 10 wt % to 87 wt % of polyethylene terephthalate (PET), 5 wt % to 45 wt % of a polyester copolymer used for the skin layer, 4 wt % to 25 wt % of polyamide (MXD6) and 4 wt % to 20 wt % of an acid-modified polyolefin resin can be used suitably, and a returned item may be used.

Thickness is not particularly limited but desirably 200 μm to 3000 μm. And, the ratio of respective layers in thickness is not particularly limited, but it is preferable that the skin layer is 10 to 45% of the whole, the adhesive layer is 3 to 20% of the whole, the innermost layer is 5 to 25% of the whole, and the intermediate core layer is 10 to 82% of the whole.

Embodiment 2-8 maintains the same effect as Embodiment 2-7 excepting transparency and a returned item can be used as a resin for the intermediate core layer, excelling in the cost performance. And, it can be suitably used as a packaging container for aseptic filling food and drink not requiring transparency.

<Embodiment 2-9>

Embodiment 2-9 is a laminate having a three-layered structure consisting of a core layer and a skin layer laminated on either side of the core layer.

The skin layer is formed of a polyester copolymer in which a molar ratio of 2,6-naphthalene group and phenylene group (2,6-naphthalene group/phenylene group) is 85/15 to 98/2, preferably 85/15 to 95/5.

The core layer is formed of a amorphous resin which includes a thermoplastic polyester resin as the main constituent. A crystalline resin is not desirable because whitening may occur when forming.

Here, the same thermoplastic polyester resin as that described in connection with the core layer of Embodiment 1-1 can be used. The above-described main constituent means 50 wt % or more, and desirably 93 wt % or more, of the thermoplastic polyester resin.

Specifically, the polyester copolymer used for the skin layer can be used suitably in view of recycling efficiency, and a returned item may be used in view of cost efficiency.

Embodiment 2-9 does not need to have a layer formed of a polymer alloy, which consists of a heat-resistant resin and a thermoplastic polyester resin containing 50 to 65 wt % of the heat-resistant resin, as in Embodiments 2-1 and 2-2, because the polyester copolymer forming the skin layer is superior in heat resistance. Thus, it excels in cost efficiency.

[First Laminate and Second Laminate]

A method of producing a laminate of the present invention is not particularly limited, and the resins which form the respective layers are formed into a laminate by a co-extrusion process or extrusion laminating process. Thus, a conventionally known method can be used for production.

The laminate of the present invention is a superior material for sheet forming of a cup-shaped packaging container or a tray-shaped packaging container for food and drink having a pH of less than 4.0 such as jelly (also water ice in the case of the second laminate), for high-temperature circulating food which is subject to heat sterilization processing, or for aseptic filling food and drink, and this laminate can also be used to form a packing bag for retort food.

[Packaging Container]

The packaging container of the present invention has a container body which is formed of the above-mentioned laminate and has an opening at the upper portion. Specifically, it consists of the container body and a lid body for opening/closing the opening to allow loading/unloading of food or drink.

Figure 2:
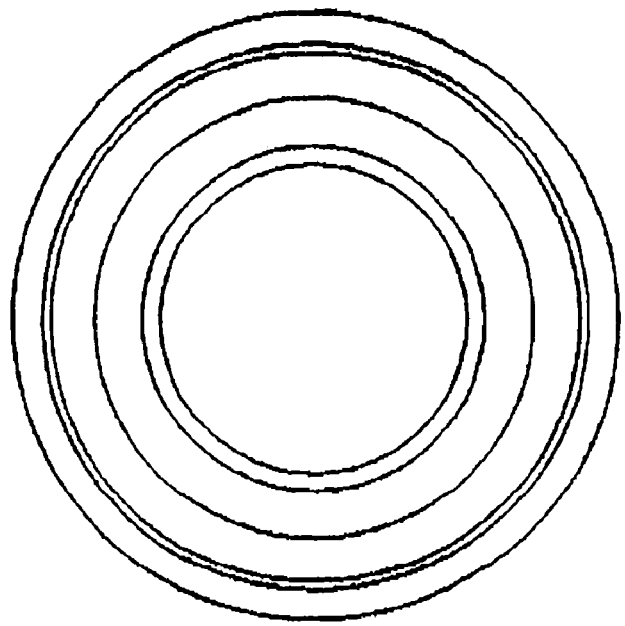
FIG. 2 is a diagram showing another example of the shape of a container body of the present invention, (a) is a top view, and (b) is a cross-sectional view.
Figure 2:
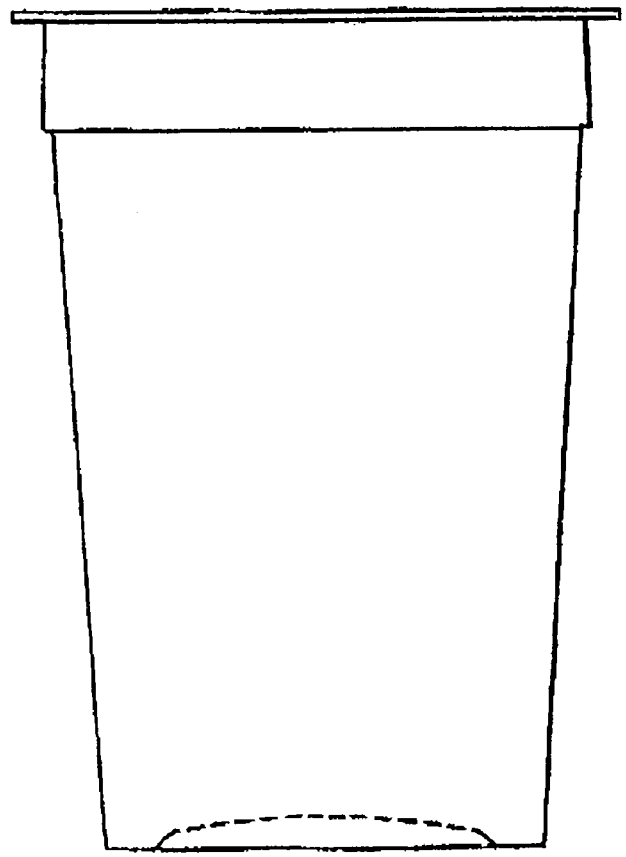

For example, as shown in FIG. 1 and FIG. 2, the above-described laminated sheet is formed into the container body having an inverted truncated cone shape by pneumatic molding, preferably by using a simultaneous punching pneumatic molding machine, and it has a flange at the top end of the body section and a bottom at the lower end.

The lid body has the surface layer formed of a thermoplastic polyester resin and bonded to the flange of the container body by heating and welding (heat sealing) or radio frequency induction heating so to shield the opening of the container body. The lid body is not particularly limited as long as the surface layer is formed of a thermoplastic polyester resin, and an aluminum substrate (aluminum foil), a film substrate or the like can be used, but the first laminate and the laminate of Embodiment 2-9 are desired to be a film substrate in order to obtain sufficient airtightness.

EXAMPLES

The present invention will be described in further detail with reference to Examples.

Evaluation methods in Examples are as follows.

(1) Heat Resistance

① Shrinkage of Container

The container filled with hot water of 65° C. was sealed with the lid body, heated at 87° C. for 30 minutes (container shrinkage A: sterilization condition for food having a pH of less than 4.0), or sprayed with a hydrogen peroxide solution heated to 120° C. for two seconds, dried with hot air of 140° C. for four seconds (container shrinkage B: sterilization condition for aseptic filling food), and the rate of change before and after the treatment was measured (the capacity was measured on a water weight basis). When a capacity change was within 2.5%, it was indicated by ○, and when the capacity change exceeded 2.5%, it was indicated by ×.

An empty container was also subjected to the same test, and when the capacity change was within 2.5%, it was indicated by ○, and when the capacity change exceeded 2.5%, it was indicated by ×.

② Change in Shape

After the filled container was measured for its container shrinkage, the sample was visually observed for buckling (the bottom swelled to cause a change in shape) and shrinkage of the body section. No change was indicated by ○, and buckling or shrinkage of the body section was indicated by ×.

(2) Impact Resistance

① Drop Test

The container filled with hot water of 65° C. was sealed with the lid body and thermally treated at 87° C. for 30 minutes (drop test A: sterilization condition for food having a pH of less than 4.0). The container filled its 80% with hot water of 65° C. was sealed with the lid body (drop test B: condition for aseptic filling food) and left standing at 4° C. for 24 hours. Such a container was dropped two times continuously from a height of 80 cm for bottom face vertical dropping (condition for the container having a content of less than 100 g. The above severe condition was adopted because, when the content was 100 g or more and less than 400 g, the test condition was a drop from a height of 50 cm.) and dropped two times continuously from a height of 50 cm for side face vertical dropping. And, evaluation was made according to the following criteria.

○: No leakage.
Δ: Leaked when dropped two times.
×: Leaked when dropped one time.

② Grip Test

The container was left standing at 4° C., hardly squeezed in vertical and horizontal directions, and visually observed for a level of breakage. When the flange was free from a crack, it was indicated by ○, when a crack was caused by squeezing in either of the directions, it was indicated by Δ, and when cracks were caused by squeezing in both directions, it was indicated by ×.

(3) Gas Barrier Properties (Oxygen Permeability)

Oxygen permeability of each container was measured by "OX-TRAN 2/20" manufactured by MOCON under conditions of 23%, a relative humidity of 60% and 24 hours.

(4) Sealing Properties

After the container body and the lid body were heat-sealed (heat seal conditions: single flat sealing at 180° C. for 1.5 seconds for a film closure, and single flat sealing at 210° C. for 1.5 seconds for an aluminum closure), and the heat-sealed portion was cut to a width of 15 mm. Its peel strength was measured by a strograph manufactured by Suga Test Instruments at a peel angle of 90° and a rate of pulling of 100 mm/min. Evaluation was made according to the following criteria.

⊚: 1.5 kg/15 mm or more
○: 0.8 kg to less than 1.5 kg/15 mm
×: Less than 0.8 kg/15 mm.

(5) Transparency

Haze of the sheet was measured by HR-100 of MURAKAMI COLOR RESEARCH LABORATORY according to JIS K7105.

(6) Ultraviolet Barrier Properties

Light transmittance of the sheet was measured by a Hitachi spectrophotometer U-4000, and evaluation was made according to the following criteria.
○: In the range of 260 nm to 370 nm, 10% or below
Δ: In the range of 260 nm to 340 nm, 10% or below
   In the range of 340 nm to 370 nm, 10% to 80%
×: In the range of 260 nm to 300 nm, 15% to 70%
   In the range of 300 nm to 370 nm, 70% or more.

(7) Flavor Resistance

Various kinds of flavors (extracts from natural juice) of NARIZUKA Corporation, Ltd. shown in Tables 1 to 9 each were put in the container body by 0.28% of the capacity of the container body, water of 40° C. or below was charged in it, and the container was sealed with the lid body and thermally treated at 87° C. for 30 minutes (flavor resistance A: sterilization condition for food with a pH of less than 4.0), or an aqueous solution having various kinds of flavors shown in Tables 1 to 9 each added by 0.28% of the capacity of the container body was heated to 65° C. and charged into the container, the container was sealed with the lid body (flavor resistance B: condition for aseptic filling food), and the state of the container body was visually observed. Six samples of the respective flavors were evaluated. No change was indicated by ○, a slight change was indicated by Δ, and whitening was indicated by ×.

The resins used in Examples are as follows.

Polyethylene terephthalate (PET): Brand name "NEH-2070" manufactured by Unitika Ltd.

Polyarylate resin (PAR): Brand name "U-100" manufactured by Unitika Ltd. (Tg=193° C. and an Izod impact test value of 218.5 J/m when tested with a ⅛" notch under conditions of 23° C. and a relative humidity of 50).

Polyethylene-2,6-naphthalate (PEN): Brand name "TN-8060" manufactured by Teijin Chemicals Ltd.

PET-PAR based polymer alloy: Brand name "U-8000" manufactured by Unitika Ltd. (PAR (Tg=193° C. and an Izod impact test value of 218.5 J/m when tested with a ⅛' notch under 23° C. and a relative humidity of 50%) 60 wt %, PET 40 wt %).

Polyamide (MXNy): Brand name "MX Nylon S6011" (same as MXD6) manufactured by Mitsubishi Gas Chemical Co., Inc.

Adhesive agent (AD): Brand name "MODIC F534" manufactured by Mitsubishi Chemical Corporation.

Example 1

Embodiment 1-2

Using the resins shown below, an 800 μm thick laminated sheet having a five-layered structure (a ratio of layer thickness: skin layer 10%/intermediate layer 10%/core layer 60%/intermediate layer 10%/skin layer 10%) was produced by a co-extrusion process.
Core layer: Polymer alloy of PET, PEN and PAR (PET 80 wt %, PEN 10 wt %, PAR 10 wt %).
Intermediate layer: PET-PAR based polymer alloy.
Skin layer: Polymer alloy of PET and PEN (Tg=100° C., a molar ratio of 2,6-naphthalene group and phenylene group (2,6-naphthalene group/phenylene group) is 60/40).

This laminated sheet was formed into the cup-shaped container body having an inside capacity of 110 cc and a height of 47.3 mm as shown in FIG. 1 by a simultaneous punching pneumatic molding machine and evaluated. The results are shown in Table 1.

For the lid body, an easy-peel transparent film having the layer structure indicated below was used.
Nylon (NY) 15 μm/barrier nylon (NY) 15 μm/special polyethylene (PE) 30 μm/polyester coat 2 μm.

Example 2

Embodiment 1-1

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated. The results are shown in Table 1.
Core layer: PET-PAR based polymer alloy.
Skin layer: Polymer alloy of PET and PEN used as the resin for the skin layer in Example 1.

TABLE 1

| | | Example 1 | Example 2 |
|---|---|---|---|
| Heat resistance | Container shrinkage A (Filled container/empty container) | ○/○ | ○/○ |
| | Change in shape | ○ | ○ |
| Impact resistance | Drop test A (Bottom face drop/side face drop) | ○/○ | ○/○ |
| | Grip test | ○ | ○ |
| Gas barrier properties (cc/container · 24 hr · atm) | | 0.08 | 0.10 |
| Sealing properties | | ○ | ○ |
| Transparency (%) | | 0.69 | 0.93 |
| Ultraviolet barrier properties | | ○ | ○ |
| Flavor resistance A | Muscat FLA 0076-U | ○/○/○/○/○/○ | ○/○/○/○/○/○ |
| | Muscat FLA 1686 | ○/○/○/○/○/○ | ○/○/○/○/○/○ |
| | Peach FLA 0048-V | ○/○/○/○/○/○ | ○/○/○/○/○/○ |
| | Peach FLA 1186 | ○/○/○/○/○/○ | ○/○/○/○/○/○ |
| | Orange ESS | ○/○/○/○/○/○ | ○/○/○/○/○/○ |
| | Valencia Orange ESS Super 1656 | ○/○/○/○/○/○ | ○/○/○/○/○/○ |
| | Apple FLA 0158-U | ○/○/○/○/○/○ | ○/○/○/○/○/○ |
| | Apple FLA 0173-U | ○/○/○/○/○/○ | ○/○/○/○/○/○ |
| | Lemon ESS | ○/○/○/○/○/○ | ○/○/○/○/○/○ |
| | La-france FLA 0061-V | ○/○/○/○/○/○ | ○/○/○/○/○/○ |
| | Plum FLA 0027-RNEW | ○/○/○/○/○/○ | ○/○/○/○/○/○ |
| | Plum ESS 2226 | ○/○/○/○/○/○ | ○/○/○/○/○/○ |
| | Pear FLA 1700 | ○/○/○/○/○/○ | ○/○/○/○/○/○ |

Example 3

Embodiment 1-4

Using the resins shown below, an 800 μm thick laminated sheet having a five-layered structure (a ratio of layer thickness: skin layer 10%/intermediate layer 10%/core layer 60%/intermediate layer 10%/skin layer 10%) was produced by a co-extrusion process. This laminated sheet was formed into a container body having the same size and shape as that of Example 1 and evaluated. The results are shown in Table 2.

Core layer: Polymer alloy of PET, copolymer used as the resin for the intermediate layer and PEN (molar ratio of 2,6-naphthalene group and phenylene group (2,6-naphthalene group/phenylene group) is 16/84).

Intermediate layer: Copolymer of 2,6-naphthalene dicarboxylic acid, terephthalic acid and ethylene glycol (Tg=115° C., molar ratio of 2,6-naphthalene group and phenylene group (2,6-naphthalene group/phenylene group) is 92/8).

Skin layer: Polymer alloy of PET and PEN used as the resins for the skin layer in Example 1.

Example 4

Embodiment 1-3

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated. The results are shown in Table 2.

Core layer: Copolymer used as the resin for the intermediate layer in Example 3.

Skin layer: Polymer alloy of PET and PEN used as the resins for the skin layer in Example 1.

TABLE 2

| | | Example 3 | Example 4 |
|---|---|---|---|
| Heat resistance | Container shrinkage A (Filled container/empty container) | ○/○ | ○/○ |
| | Change in shape | ○ | ○ |
| Impact resistance | Drop test A (Bottom face drop/side face drop) | ○/Δ | Δ/Δ |
| | Grip test | ○ | Δ |
| Gas barrier properties (cc/container · 24 hr · atm) | | 0.04 | 0.03 |
| Sealing properties | | ○ | ○ |
| Transparency (%) | | 0.98 | 0.56 |
| Ultraviolet barrier properties | | ○ | ○ |
| Flavour resistance A | Muscat FLA 0076-U | ○/○/○/○/○ | ○/○/○/○/○ |
| | Muscat FLA 1686 | ○/○/○/○/○ | ○/○/○/○/○ |
| | Peach FLA 0048-V | ○/○/○/○/○ | ○/○/○/○/○ |
| | Peach FLA 1186 | ○/○/○/○/○ | ○/○/○/○/○ |
| | Orange ESS | ○/○/○/○/○ | ○/○/○/○/○ |
| | Valencia Orange ESS Super 1656 | ○/○/○/○/○ | ○/○/○/○/○ |
| | AppleFLA 0158-U | ○/○/○/○/○ | ○/○/○/○/○ |
| | Apple FLA 0173-U | ○/○/○/○/○ | ○/○/○/○/○ |
| | Lemon ESS | ○/○/○/○/○ | ○/○/○/○/○ |
| | La-france FLA 0061-V | ○/○/○/○/○ | ○/○/○/○/○ |
| | Plum FLA 0027-RNEW | ○/○/○/○/○ | ○/○/○/○/○ |
| | Plum ESS 2226 | ○/○/○/○/○ | ○/○/○/○/○ |
| | Pear FLA 1700 | ○/○/○/○/○ | ○/○/○/○/○ |

Example 5

Embodiment 1-5

Using the resins shown below, an 800 μm thick laminated sheet having a seven-layered structure (a ratio of layer thickness: skin layer 30%/intermediate layer 10%/adhesive layer 2.5%/innermost layer 15%/adhesive layer 2.5%/intermediate layer 10%/skin layer 30%) was produced by a co-extrusion process. This laminated sheet was formed into a container body having the same size and shape as that of Example 1 and evaluated. The results are shown in Table 3.

Innermost layer: MXNy
Adhesive layer: AD
Intermediate layer: PET-PAR based polymer alloy
Skin layer: Polymer alloy of PET and PEN used as the resins for the skin layer in Example 1.

Example 6

Embodiment 1-6

Using the resins shown below, an 800 μm thick laminated sheet having an eight-layered structure (a ratio of layer thickness: skin layer 10%/intermediate layer 10%/intermediate core layer 40%/adhesive layer 2.5%/innermost layer 15%/adhesive layer 2.5%/intermediate layer 10%/skin layer 10%) was produced by a co-extrusion process. This laminated sheet was formed into a container body having the same size and shape as that of Example 1 and evaluated. The results are shown in Table 3.

Innermost layer: MXNy
Adhesive layer: AD
Intermediate core layer: Polymer alloy of PET, PEN, PAR, AD and MXNy (PET 76 wt %, PEN 6 wt %, PAR 6 wt %, AD 5 wt %, MXNy 7 wt %).
Intermediate layer: PET-PAR based polymer alloy.
Skin layer: Polymer alloy of PET and PEN used as the resins for the skin layer in Example 1.

TABLE 3

| | | Example 5 | Example 6 |
|---|---|---|---|
| Heat resistance | Container shrinkage A (Filled container/empty container) | ○/○ | ○/○ |
| | Change in shape | ○ | ○ |
| Impact resistance | Drop test A (Bottom face drop/side face drop) | ○/○ | ○/○ |
| | Grip test | ○ | ○ |
| Gas barrier properties (cc/container · 24 hr · atm) | | 0.01 | 0.01 |
| Sealing properties | | ○ | ○ |
| Transparency (%) | | 1.0 | 80 |
| Ultraviolet barrier properties | | ○ | ○ |
| Flavour resistance A | Muscat FLA 0076-U | ○/○/○/○/○ | ○/○/○/○/○ |
| | Muscat FLA 1686 | ○/○/○/○/○ | ○/○/○/○/○ |
| | Peach FLA 0048-V | ○/○/○/○/○ | ○/○/○/○/○ |
| | Peach FLA 1186 | ○/○/○/○/○ | ○/○/○/○/○ |
| | Orange ESS | ○/○/○/○/○ | ○/○/○/○/○ |
| | Valencia Orange ESS Super 1656 | ○/○/○/○/○ | ○/○/○/○/○ |
| | Apple FLA 0158-U | ○/○/○/○/○ | ○/○/○/○/○ |
| | Apple FLA 0173-U | ○/○/○/○/○ | ○/○/○/○/○ |
| | Lemon ESS | ○/○/○/○/○ | ○/○/○/○/○ |
| | La-france FLA | ○/○/○/○/○ | ○/○/○/○/○ |

TABLE 3-continued

|  | Example 5 | Example 6 |
|---|---|---|
| 0061-V |  |  |
| Plum FLA 0027-RNEW | ○/○/○/○/○ | ○/○/○/○/○ |
| Plum ESS 2226 | ○/○/○/○/○ | ○/○/○/○/○ |
| Pear FLA 1700 | ○/○/○/○/○ | ○/○/○/○/○ |

Example 7

Embodiment 1-7

Using the resins shown below, an 800 μm thick laminated sheet having a five-layered structure (a ratio of layer thickness: skin layer 40%/adhesive layer 5%/innermost layer 12%/adhesive layer 5%/skin layer 38%) was produced by a co-extrusion process. This laminated sheet was formed into a container body having the same size and shape as that of Example 1 and evaluated. The results are shown in Table 4.

Innermost layer: MXNy
Adhesive layer: AD
Skin layer: Polymer alloy of PET and PEN used as the resins for the skin layer in Example 1.

Example 8

Embodiment 1-8

Using the resins shown below, an 800 μm thick laminated sheet having a six-layered structure (a ratio of layer thickness: skin layer 10%/intermediate core layer 60%/adhesive layer 5%/innermost layer 10%/adhesive layer 5%/skin layer 10%) was produced by a co-extrusion process. This laminated sheet was formed into a container body having the same size and shape as that of Example 1 and evaluated. The results are shown in Table 4.

Innermost layer: MXNy
Adhesive layer: AD
Intermediate core layer: Polymer alloy of PET, PEN, AD and MXNy (PET 82 wt %, PEN 8 wt %, AD 5 wt %, MXNy 5 wt %).
Skin layer: Polymer alloy of PET and PEN used as the resins for the skin layer in Example 1.

TABLE 4

|  |  | Example 7 | Example 8 |
|---|---|---|---|
| Heat resistance | Container shrinkage B (Filled container/empty container) | ○/○ | ○/○ |
|  | Change in shape | ○ | ○ |
| Impact resistance | Drop test B (Bottom face drop/side face drop) | ○/○ | ○/○ |
|  | Grip test | ○ | ○ |
| Gas barrier properties (cc/container · 24 hr · atm) |  | 0.01 | 0.01 |
| Sealing properties |  | ○ | ○ |
| Transparency (%) |  | 0.90 | 80 |
| Ultraviolet barrier properties |  | ○ | ○ |
| Flavour resistance B | Muscat FLA 0076-U | ○/○/○/○/○ | ○/○/○/○/○ |
|  | Muscat FLA 1686 | ○/○/○/○/○ | ○/○/○/○/○ |
|  | Peach FLA 0048-V | ○/○/○/○/○ | ○/○/○/○/○ |

TABLE 4-continued

|  | Example 7 | Example 8 |
|---|---|---|
| Peach FLA 1186 | ○/○/○/○/○ | ○/○/○/○/○ |
| Orange ESS | ○/○/○/○/○ | ○/○/○/○/○ |
| Valencia Orange ESS Super 1656 | ○/○/○/○/○ | ○/○/○/○/○ |
| Apple FLA 0158-U | ○/○/○/○/○ | ○/○/○/○/○ |
| Apple FLA 0173-U | ○/○/○/○/○ | ○/○/○/○/○ |
| Lemon ESS | ○/○/○/○/○ | ○/○/○/○/○ |
| La-france FLA 0061-V | ○/○/○/○/○ | ○/○/○/○/○ |
| Plum FLA 0027-RNEW | ○/○/○/○/○ | ○/○/○/○/○ |
| Plum ESS 2226 | ○/○/○/○/○ | ○/○/○/○/○ |
| Pear FLA 1700 | ○/○/○/○/○ | ○/○/○/○/○ |

Example 9

Embodiment 2-2

Using the resins shown below, an 800 μm thick laminated sheet having a five-layered structure (a ratio of layer thickness: skin layer 10%/intermediate layer 10%/core layer 60%/intermediate layer 10%/skin layer 10%) was produced by a co-extrusion process. This laminated sheet was formed into a container body having the same size and shape as that of Example 1 and evaluated. The results are shown in Table 5.

Core layer: Polymer alloy of PET, a polyester copolymer used as the resin for the skin layer and PAR (PET 80 wt %, polyester copolymer 10 wt %, PAR 10 wt %).
Intermediate layer: PET-PAR based polymer alloy.
Skin layer: Polyester copolymer of 2,6-naphthalene dicarboxylic acid, terephthalic acid, 1,4-cyclohexane dimethanol and ethylene glycol [a molar ratio of 2,6-naphthalene group and phenylene group (2,6-naphthalene group/phenylene group) is 60/40, a molar ratio of 1,4-cyclohexylene group and ethylene group (1,4-cyclohexylene group/ethylene group) is 40/60, a molar ratio of the cis form and the trans form (cis/trans) of 1,4-cyclohexylene group is 30/70].

For the lid body, an aluminum lid material having the layer structure below and manufactured by Showa Denko Packaging Co., Ltd. was used.

Polyethylene terephthalate (PET) 25 μm/aluminum (AL) 30 μm/polyester sealant 3 to 5 μm.

Example 10

Embodiment 2-1

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated in the same way as in Example 9. The results are shown in Table 5.

Core layer: PET-PAR based polymer alloy
Skin layer: Polyester copolymer used as the resin for the skin layer in Example 9.

TABLE 5

|  |  | Example 9 | Example 10 |
|---|---|---|---|
| Heat resistance | Container shrinkage A (Filled container/empty container) | ○/○ | ○/○ |
|  | Change in shape | ○ | ○ |
| Impact resistance | Drop test A (Bottom face drop/side face drop) | ○/○ | ○/○ |
|  | Grip test | ○ | ○ |
| Gas barrier properties (cc/container · 24 hr · atm) |  | 0.08 | 0.13 |
| Sealing properties |  | ◎ | ◎ |
| Transparency (%) |  | 0.61 | 0.52 |
| Ultraviolet barrier properties |  | ○ | ○ |
| Flavour resistance A | Muscat FLA 0076-U | ○/○/○/○/○ | ○/○/○/○/○ |
|  | Muscat FLA 1686 | ○/○/○/○/○ | ○/○/○/○/○ |
|  | Peach FLA 0048-V | ○/○/○/○/○ | ○/○/○/○/○ |
|  | Peach FLA 1186 | ○/○/○/○/○ | ○/○/○/○/○ |
|  | Orange ESS | ○/○/○/○/○ | ○/○/○/○/○ |
|  | Valencia Orange ESS Super 1656 | ○/○/○/○/○ | ○/○/○/○/○ |
|  | Lemon ESS | ○/○/○/○/○ | ○/○/○/○/○ |
|  | La-france FLA 0061-V | ○/○/○/○/○ | ○/○/○/○/○ |
|  | Plum FLA 0027-RNEW | ○/○/○/○/○ | ○/○/○/○/○ |
|  | Pear FLA 1700 | ○/○/○/○/○ | ○/○/○/○/○ |

TABLE 6

|  |  | Example 11 | Example 12 |
|---|---|---|---|
| Heat resistance | Container shrinkage A (Filled container/empty container) | ○/○ | ○/○ |
|  | Change in shape | ○ | ○ |
| Impact resistance | Drop test A (Bottom face drop/side face drop) | ○/○ | ○/Δ |
|  | Grip test | ○ | ○ |
| Gas barrier properties (cc/container · 24 hr · atm) |  | 0.04 | 0.03 |
| Sealing properties |  | ◎ | ◎ |
| Transparency (%) |  | 0.65 | 0.40 |
| Ultraviolet barrier properties |  | ○ | ○ |
| Flavor resistance A | Muscat FLA 0076-U | ○/○/○/○/○ | ○/○/○/○/○ |
|  | Muscat FLA 1686 | ○/○/○/○/○ | ○/○/○/○/○ |
|  | Peach FLA 0048-V | ○/○/○/○/○ | ○/○/○/○/○ |
|  | Peach FLA 1186 | ○/○/○/○/○ | ○/○/○/○/○ |
|  | Orange ESS | ○/○/○/○/○ | ○/○/○/○/○ |
|  | Valencia Orange ESS Super 1656 | ○/○/○/○/○ | ○/○/○/○/○ |
|  | Lemon ESS | ○/○/○/○/○ | ○/○/○/○/○ |
|  | La-france FLA 0061-V | ○/○/○/○/○ | ○/○/○/○/○ |
|  | Plum FLA 0027-RNEW | ○/○/○/○/○ | ○/○/○/○/○ |
|  | Pear FLA 1700 | ○/○/○/○/○ | ○/○/○/○/○ |

Example 11

Embodiment 2-4

Using the resins shown below, an 800 μm thick laminated sheet having a five-layered structure (a ratio of layer thickness: skin layer 10%/intermediate layer 10%/core layer 60%/intermediate layer 10%/skin layer 10%) was produced by a co-extrusion process. This laminated sheet was formed into a container body having the same size and shape as that of Example 1 and evaluated in the same way as in Example 9. The results are shown in Table 6.

Core layer: Polymer alloy (PET 81 wt %, copolymer 9 wt %, and polyester copolymer 10 wt %) of PET, a copolymer used as the resin for the intermediate layer and a polyester copolymer used as the resin for the skin layer.

Intermediate layer: Copolymer used as the resin for the intermediate layer in Example 3.

Skin layer: Polyester copolymer used as the resin for the skin layer in Example 9.

Example 12

Embodiment 2-3

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated by the same way as in Example 9. The results are shown in Table 6.

Core layer: Copolymer used as the resin for the intermediate layer in Example 3.

Skin layer: Polyester copolymer used as the resin for the skin layer in Example 9.

Example 13

Embodiment 2-5

Using the resins shown below, an 800 μm thick laminated sheet having a seven-layered structure (a ratio of layer thickness: skin layer 30%/intermediate layer 10%/adhesive layer 5%/innermost layer 15%/adhesive layer 5%/intermediate layer 10%/skin layer 25%) was produced by a co-extrusion process. This laminated sheet was formed into a container body having the same size and shape as that of Example 1 and evaluated in the same way as in Example 9. The results are shown in Table 7.

Innermost layer: MXNy

Adhesive layer: AD

Intermediate layer: PET-PAR based polymer alloy.

Skin layer: Polyester copolymer used as the resin for the skin layer in Example 9.

Example 14

Embodiment 2-6

Using the resins shown below, an 800 μm thick laminated sheet having an eight-layered structure (a ratio of layer thickness: skin layer 10%/intermediate layer 10%/intermediate core layer 40%/adhesive layer 2.5%/innermost layer 15%/adhesive layer 2.5%/intermediate layer 10%/skin layer 10%) was produced by a co-extrusion process. This laminated sheet was formed into a container body having the same size and shape as that of Example 1 and evaluated in the same way as in Example 9. The results are shown in Table 7.

Innermost layer: MXNy

Adhesive layer: AD

Intermediate core layer: Polymer alloy of PET, polyester copolymer used as the resin for the skin layer, PAR, AD and MXNy (PET 72 wt %, a polyester copolymer 10 wt %, PAR 6 wt %, AD 5 wt %, and MXNy 7 wt %).
Intermediate layer: PET-PAR based polymer alloy.
Skin layer: Polyester copolymer used as the resin for the skin layer in Example 9.

TABLE 7

|  |  | Example 13 | Example 14 |
|---|---|---|---|
| Heat resistance | Container shrinkage A (Filled container/empty container) | ○/○ | ○/○ |
|  | Change in shape | ○ | ○ |
| Impact resistance | Drop test A (Bottom face drop/side face drop) | ○/○ | ○/○ |
|  | Grip test | ○ | ○ |
| Gas barrier properties (cc/ container · 24 hr · atm) |  | 0.01 | 0.01 |
| Sealing properties |  | ◎ | ◎ |
| Transparency (%) |  | 0.95 | 84 |
| Ultraviolet barrier properties |  | ○ | ○ |
| Flavor resistance A | Muscat FLA 0076-U | ○/○/○/○/○/○ | ○/○/○/○/○/○ |
|  | Muscat FLA 1686 | ○/○/○/○/○ | ○/○/○/○/○ |
|  | Peach FLA 0048-V | ○/○/○/○/○ | ○/○/○/○/○ |
|  | Peach FLA 1186 | ○/○/○/○/○ | ○/○/○/○/○ |
|  | Orange ESS | ○/○/○/○/○ | ○/○/○/○/○ |
|  | Valencia Orange ESS Super 1656 | ○/○/○/○/○ | ○/○/○/○/○ |
|  | Lemon ESS | ○/○/○/○/○ | ○/○/○/○/○ |
|  | La-france FLA 0061-V | ○/○/○/○/○ | ○/○/○/○/○ |
|  | Plum FLA 0027-RNEW | ○/○/○/○/○ | ○/○/○/○/○ |
|  | Pear FLA 1700 | ○/○/○/○/○ | ○/○/○/○/○ |

Example 15

Embodiment 2-7

Using the resins shown below, an 800 μm thick laminated sheet having a five-layered structure (a ratio of layer thickness: skin layer 40%/adhesive layer 5%/innermost layer 15%/adhesive layer 5%/skin layer 35%) was produced by a co-extrusion process. This laminated sheet was formed into a container body having the same size and shape as that of Example 1 and evaluated in the same way as in Example 9. The results are shown in Table 8.
Innermost layer: MXNy
Adhesive layer: AD
Skin layer: Polyester copolymer used as the resin for the skin layer in Example 9.

Example 16

Embodiment 2-8

Using the resins shown below, an 800 μm thick laminated sheet having a six-layered structure (a ratio of layer thickness: skin layer 10%/intermediate core layer 60%/adhesive layer 5%/innermost layer 10%/adhesive layer 5%/skin layer 10%) was produced by a co-extrusion process. This laminated sheet was formed into a container body having the same size and shape as that of Example 1 and evaluated in the same way as in Example 9. The results are shown in Table 8.

Innermost layer: MXNy
Adhesive layer: AD
Intermediate core layer: Polymer alloy of PET, polyester copolymer used as the resin for the skin layer, AD and MXNy (PET 80 wt %, polyester copolymer 10 wt %, AD 5 wt %, and MXNy 5 wt %).
Skin layer: Polyester copolymer used as the resin for the skin layer in Example 9.

TABLE 8

|  |  | Example 15 | Example 16 |
|---|---|---|---|
| Heat resistance | Container shrinkage B (Filled container/empty container) | ○/○ | ○/○ |
|  | Change in shape | ○ | ○ |
| Impact resistance | Drop test B (Bottom face drop/side face drop) | ○/○ | ○/○ |
|  | Grip test | ○ | ○ |
| Gas barrier properties (cc/container · 24 hr · atm) |  | 0.01 | 0.01 |
| Sealing properties |  | ◎ | ◎ |
| Transparency (%) |  | 0.88 | 82 |
| Ultraviolet barrier properties |  | ○ | ○ |
| Flavor resistance B | Muscat FLA 0076-U | ○/○/○/○/○/○ | ○/○/○/○/○/○ |
|  | Muscat FLA 1686 | ○/○/○/○/○ | ○/○/○/○/○ |
|  | Peach FLA 0048-V | ○/○/○/○/○ | ○/○/○/○/○ |
|  | Peach FLA 1186 | ○/○/○/○/○ | ○/○/○/○/○ |
|  | Orange ESS | ○/○/○/○/○ | ○/○/○/○/○ |
|  | Valencia Orange ESS Super 1656 | ○/○/○/○/○ | ○/○/○/○/○ |
|  | Lemon ESS | ○/○/○/○/○ | ○/○/○/○/○ |
|  | La-france FLA 0061-V | ○/○/○/○/○ | ○/○/○/○/○ |
|  | Plum FLA 0027-RNEW | ○/○/○/○/○ | ○/○/○/○/○ |
|  | Pear FLA 1700 | ○/○/○/○/○ | ○/○/○/○/○ |

Example 17

Embodiment 2-9

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated in the same way as in Example 9. The results are shown in Table 9.
Core layer: Returned item of the laminate of this Example (the same composition as the polyester copolymer used as the resin for the skin layer).
Skin layer: Polyester copolymer of 2,6-naphthalene dicarboxylic acid, terephthalic acid, 1,4-cyclohexane dimethanol and ethylene glycol [a molar ratio of 2,6-naphthalene group and phenylene group (2,6-naphthalene group/phenylene group) is 85/15, a molar ratio of 1,4-cyclohexylene group and ethylene group (1,4-cyclohexylene group/ethylene group) is 40/60, a molar ratio of the cis form and the trans form (cis/trans) of 1,4-cyclohexylene group is 30/70].

Comparative Example 1

Using the resins shown below, an 800 μm thick laminated sheet having a three-layered structure (a ratio of layer thickness: skin layer 10%/core layer 80%/skin layer 10%) was produced by a co-extrusion process. This laminated sheet was formed into a container body having the same size and shape as that of Example 1 and evaluated. The results are shown in Table 9.

Core layer: Polymer alloy (PAR 21 wt %, PET 79 wt %) of PET and PAR.

Skin layer: PET-PAR based polymer alloy.

TABLE 9

|  |  | Example 17 | Comparative Example 1 |
|---|---|---|---|
| Heat resistance | Container shrinkage A (Filled container/empty container) | ○/○ | ○/○ |
|  | Change in shape | ○ | ○ |
| Impact resistance | Drop test A (Bottom face drop/side face drop) | ○/○ | ○/○ |
|  | Grip test | ○ | ○ |
| Gas barrier properties (cc/container · 24 hr · atm) |  | 0.06 | 0.15 |
| Sealing properties |  | ○ | ○ |
| Transparency (%) |  | 0.76 | 0.65 |
| Ultraviolet barrier properties |  | ○ | Δ |
| Flavor resistance A | Muscat FLA 0076-U | ○/○/○/○/○ | X/X/X/X/X/X |
|  | Muscat FLA 1686 | ○/○/○/○/○ | ○/○/○/○/○ |
|  | Peach FLA 0048-V | ○/○/○/○/○ | ○/○/○/○/○ |
|  | Peach FLA 1186 | ○/○/○/○/○ | ○/Δ/Δ/Δ/Δ |
|  | Orange ESS | ○/○/○/○/○ | ○/○/○/○/○ |
|  | Valencia orange ESS Super 1656 | ○/○/○/○/○ | ○/○/○/○/○ |
|  | Lemon ESS | ○/○/○/○/○ | ○/○/○/○/○ |
|  | La-france FLA 0061-V | ○/○/○/○/○ | ○/○/○/○/○ |
|  | Plum FLA 0027-RNEW | ○/○/○/○/○ | ○/○/○/○/Δ |
|  | Pear FLA 1700 | ○/○/○/○/○ | ○/○/○/○/○ |

INDUSTRIAL APPLICABILITY

As described above, a first laminate of the present invention can be used suitably as a packaging container for food and drink such as a jelly container, which has sufficient flavor resistance and aroma retention not limited by kinds of flavors used for jelly and the like, excels in sealing properties with a lid body, can be sealed with an easy-peel transparent lid body and also excels in gas barrier properties, impact resistance, heat resistance, cost efficiency and transparency.

A second laminate of the present invention can be used suitably as a packaging container for food and drink such as a jelly container, a water ice container or the like, which excels in sealing properties with a lid body, can be sealed with an aluminum closure, excels in recycling efficiency with a PET resin, has sufficient flavor resistance and aroma retention not limited by kinds of flavors used for jelly, water ice and the like, and also excels in gas barrier properties, impact resistance, cold-impact resistance, heat resistance, cost efficiency and transparency.

And, a laminate containing polyamide (MXD6) in the layer structure can be used suitably as containers for aseptic filling food and drink such as coffee, juice, and the like.

The invention claimed is:

1. A laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate,
wherein the core layer is formed of a polymer alloy consisting of a thermoplastic polyester resin and a heat-resistant resin, which contains 50 to 65 wt % of the heat-resistant resin having an Izod impact test value of 80 J/m to 850 J/m when tested with a ⅛" notch under conditions of 23° C. and a relative humidity of 50% and having a glass transition point of 140° C. to 250° C.

2. The laminate according to claim 1, wherein a molar ratio of 2,6-naphthalene group and phenylene group (2,6-naphthalene group/phenylene group) of the resin forming the skin layer is 30/70 to 92/8.

3. The laminate according to claim 1, wherein the polymer alloy of the heat-resistant resin and the thermoplastic polymer resin is a polymer alloy of a polyarylate resin and polyethylene terephthalate.

4. A packaging container having a container body with an opening at the upper part, wherein the container body is formed of the laminate according to claim 1.

5. The laminate according to claim 4, wherein a molar ratio of 2,6-naphthalene group and phenylene group (2,6-naphthalene group/phenylene group) of the resin forming the skin layer is 30/70 to 92/8.

6. A laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate,
wherein:
an intermediate layer is disposed between the core layer and skin layer,
the core layer is formed of a amorphous resin including a thermoplastic resin as the main constituent, and
the intermediate layer is formed of a polymer alloy consisting of a thermoplastic polyester resin and a heat-resistant resin, which contains 50 to 65 wt % of the heat-resistant resin having an Izod impact test value of 80 J/m to 850 J/m when tested with a ⅛" notch under conditions of 23° C. and a relative humidity of 50% and having a glass transition point of 140° C. to 250° C.

7. The laminate according to claim 6, wherein the polymer alloy of the heat-resistant resin and the thermoplastic polymer resin is a polymer alloy of a polyarylate resin and polyethylene terephthalate.

8. The laminate according to claim 7, wherein a molar ratio of 2,6-naphthalene group and phenylene group (2,6-naphthalene group/phenylene group) of the resin forming the skin layer is 30/70 to 92/8.

9. A packaging container having a container body with an opening at the upper part, wherein the container body is formed of the laminate according to claim 6.

10. A laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate, wherein:

an intermediate layer is disposed between the core layer and the skin layer, the core layer is formed of a amorphous resin including a thermoplastic polyester resin as the main constituent, and the intermediate layer is formed of a copolymer having a glass transition point of 110° C. or more and consisting of 2,6-naphthalene dicarboxylic acid or its lower alkyl ester, terephthalic acid or its lower alkyl ester and ethylene glycol or a polymer alloy having a glass transition point of 110° C. or more and consisting of polyethylene terephthalate and polyethylene-2,6-naphthalate.

11. The laminate according to claim 10, wherein a molar ratio of 2,6-naphthalene group and phenylene group (2,6-naphthalene group/phenylene group) of the resin forming the skin layer is 30/70 to 92/8.

12. A packaging container having a container body with an opening at the upper part, wherein the container body is formed of the laminate according to claim 10.

13. A laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate, wherein:

an intermediate layer is disposed between the core layer and the skin layer, the core layer consists of an innermost layer formed of polyamide which is obtained by melt polymerization of a diamine component containing 70 mol % or more of metaxylylene diamine and a dicarboxylic acid component containing 70 mol % or more of adipic acid and an adhesive layer laminated on ether side of the innermost layer, and the intermediate layer is formed of a polymer alloy consisting of a thermoplastic polyester resin and a heat-resistant resin, which contains 50 to 65 wt % of the heat-resistant resin having an Izod impact test value of 80 J/m to 850 J/m when tested with a ⅛" notch under conditions of 23° C. and a relative humidity of 50% and having a glass transition point of 140° C. to 250° C.

14. The laminate according to claim 13, wherein the polymer alloy of the heat-resistant resin and the thermoplastic polymer resin is a polymer alloy of a polyarylate resin and polyethylene terephthalate.

15. The laminate according to claim 14, wherein a molar ratio of 2,6-naphthalene group and phenylene group (2,6-naphthalene group/phenylene group) of the resin forming the skin layer is 30/70 to 92/8.

16. The laminate according to claim 13, wherein an intermediate core layer of a amorphous resin which includes a thermoplastic polyester resin as the main constituent is disposed between the intermediate layer and the adhesive layer on one side of the core layer.

17. A packaging container having a container body with an opening at the upper part, wherein the container body is formed of the laminate according to claim 13.

18. A laminate having a core layer and a skin layer on either side of the core layer, wherein the skin layer is formed of a copolymer having a glass transition point of 85° C. or more and 115° C. or below and consisting of 2,6-naphthalene dicarboxylic acid or its lower alkyl ester, terephthalic acid or its lower alkyl ester and ethylene glycol or a polymer alloy having a glass transition point of 85° C. or more and 115° C. or below and consisting of polyethylene terephthalate and polyethylene-2,6-naphthalate, wherein the core layer consists of an innermost layer formed of polyamide which is obtained by melt polymerization of a diamine component containing 70 mol % or more of metaxylylene diamine and a dicarboxylic acid component containing 70 mol % or more of adipic acid and an adhesive layer laminated on ether side of the innermost layer.

19. The laminate according to claim 18, wherein an intermediate core layer formed of a amorphous resin which includes a thermoplastic polyester resin as the main constituent is disposed between the skin layer and the adhesive layer on one side of the core layer.

20. A packaging container having a container body with an opening at the upper part, wherein the container body is formed of the laminate according to claim 18.

* * * * *